United States Patent [19]

Keklak

[11] Patent Number: 4,809,201

[45] Date of Patent: Feb. 28, 1989

[54] GRAPHIC DISPLAY REGION DEFINING TECHNIQUE

[75] Inventor: John Keklak, Sommerville, Mass.

[73] Assignee: Schlumberger Systems, Inc., Ann Arbor, Mich.

[21] Appl. No.: 803,462

[22] Filed: Dec. 2, 1985

[51] Int. Cl.[4] .................. G09G 1/14; G06F 15/40
[52] U.S. Cl. ............................. 364/518; 340/747; 340/735; 364/521
[58] Field of Search ............... 364/518, 521, 900; 340/734, 735, 747, 710, 712

[56] References Cited

U.S. PATENT DOCUMENTS

| | | | |
|---|---|---|---|
| 4,396,989 | 8/1983 | Fleming et al. | 364/521 |
| 4,451,895 | 5/1984 | Sliwkowski | 364/521 |
| 4,528,642 | 7/1985 | Waller | 340/747 X |
| 4,533,910 | 8/1985 | Sukonick et al. | 364/521 X |
| 4,538,144 | 8/1985 | Yamagami | 340/747 |
| 4,549,275 | 10/1985 | Sukonick | 364/521 |
| 4,626,838 | 12/1986 | Tsujioka et al. | 340/747 X |
| 4,631,690 | 12/1986 | Corthout et al. | 364/521 X |

OTHER PUBLICATIONS

Whitton, M. C., "Memory Design for Raster Graphics Displays", *IEEE CG & A*, Mar. 1984, pp. 48–49.

Primary Examiner—Parshotam S. Lall
Assistant Examiner—Joseph L. Dixon
Attorney, Agent, or Firm—Ladas & Parry

[57] ABSTRACT

A region defining technique for use with a computer aided design system, including a geometry specification step and a loop-chasing step which together locate the complete set of sequences of linked elements which defines the inner and outer boundaries of the region of interest in response to a single user input identifying which region is of interest. The technique permits a user with a single "pick" to select a desired region of the display for further processing such as cross-hatching or extrusion, and provides a variety of useful applications not previously offered in commercially available computer aided design systems.

21 Claims, 7 Drawing Sheets

A
CR 1
L1,L2
S4  S5
S2  S6
S3  S7
S1  S8

B
CR 2
S9
S10
S11
S2

C
CR 3
L1,L2
S12  S15
S13  S16
S9   S17
S14  S18

CR 12
S3  S5
S4  S6
S1  S7
S9  S8
S10
S11

CR 3

CR 1,2,3
S10  S5   S15
S11  S6   S16
S3   S7   S17
S4   S8   S18
S1
S14
S12
S13

GRAPHIC DISPLAY REGION DEFINING TECHNIQUE

FIELD OF THE INVENTION

The present invention relates generally to techniques useful with graphics systems used in displaying a computer generated image, and more particularly to techniques for identifying and defining a desired closed-boundary region of the displayed image for further processing.

DISCUSSION OF THE TECHNICAL PROBLEM

It is becoming increasingly common and useful for design engineers to perform product design with the assistance of a computer aided design system, creating and storing the design in computer memory and displaying the evolving design on a graphics display terminal It is repeatedly useful during the design and modification process for the designer to select a particular closed segment or region of the display for further processing, e.g., for cross-hatching, area fill, hidden line removal, sectional property evaluation, trimmed surface treatment or extrusion. Such picking of areas may be conveniently done through the use of a digitizer tablet and pen or through the use of a mouse. Unfortunately, while it would have been quite convenient for the user to select a desired region for further attention in this manner, prior art systems lacked the capability to recognize the boundaries of the region so selected. Accordingly, it was required that the user identify each segment which made up the boundary of the region desired, and to break any segment of which only a portion contributed to the region boundary into separate segments to extract exactly the portion contained in the boundary. This intensive user input made such procedures both slow and error prone, and the need to break boundary segments from the larger segments of which they were formerly a part was often counterproductive because the user wanted such larger segments to remain intact for other processing activity.

It would be desirable to have a fast technique for defining the boundaries of selected regions of a graphic image in a computer aided design system in a manner which minimizes the number of inputs required of the user and which does not introduce any undesirable side effects on the data representing a design.

SUMMARY OF THE INVENTION

The present invention provides a technique for defining the boundaries of a selected region of an image displayed on a computer aided design system graphics monitor, in order to permit such a selected region to be used for further processing, e.g., cross-hatching, extrusion, area fill, hidden line removal, etc. The technique includes the steps of providing the set of segments which contain the elements defining the boundary of the desired region, indicating which region is desired, and locating the set of elements which form the boundary of the indicated region.

The technique is applicable to define region boundaries in two or more dimensions, and requires in its simplest form that a user input only a single point within the desired region. For contiguous closed regions the invention provides for the automatic combination of selected regions and a determination of the combined boundary.

The step of providing the set of geometric segments most generally involves specifying the design which contains the region to be further processed. The technique of the present invention is made significantly more efficient when the user indicates the locality in the design from which geometric segments should be considered for identifying the boundary of the region to be processed.

This step may optionally include a step which is referred to herein as the geometry preparation procedure, which includes steps that enhance the efficiency of the region boundary identification technique, but are not strictly required. These steps are: projection of the segments onto a plane; breaking the segments at all intersection points; identifying all sets of coincident segment endpoints; eliminating segments of zero length; eliminating (redundant) coincident segments; and eliminating all segments which have endpoints which are not coincident with other segment endpoints. If these operations are not performed, the boundary identification may still proceed, although the method for identifying the boundary elements must be sufficiently complex to recognize the degenerate situations which in the preferred implementation are eliminated by the geometry preparation procedure, and hence to correctly identify the boundary of the indicated region.

The step of identifying the region of interest is referred to herein as the region-biasing procedure. One preferred and convenient method for indicating the desired region is to provide a point which is contained in the region. This point is termed the bias point of the region. Other methods of region identification may be used, but all such methods are similar to generating a point in the region of interest. For example, in the current implementation, when a point in the desired region is not provided, the technique assumes a point some distance from the provided geometry sufficiently large as to place the point outside of the area containing the geometry. This point serves to bias the region consisting of the set of all points except those contained in any loops formed by the provided geometry.

The step of locating the set of elements forming the boundary is referred to herein as the loop-chasing procedure and includes the steps of locating an element in one of the loops contained in the boundary of the biased region and identifying the remaining members of this loop by proceeding along intersecting segments in a direction toward the interior of the biased region at each intersection point. After the location of a loop, the geometry list is scanned to identify segments which can be determined not to contribute to additional loops to be located, and such segments are removed from further consideration in loop-chasing. The loop-chasing procedure is repeated until all of the segments in the provided geometry are utilized, indicating that all of the loops of the desired boundary have been located.

The step of locating the first element of a loop consists of projecting a ray from the bias point through the geometry remaining at that stage of the boundary identification operation and identifying the intersection points between the ray and the remaining geometry. The segment producing the ray intersection point closest to the bias point is identified as a member of a loop serving as part of the boundary of the region containing the bias point.

The step of identifying the remaining members of the loop consists of traversing the first intersected segment to the first junction between such segment and any other remaining segments in the provided geometry, and turning toward the interior of the biased region at the first and each subsequent junction until the loop returns to the portion of the segment which forms the first element of the loop. This operation may be conveniently performed by orienting the direction of travel along the first segment in a direction such that the bias point appears to the left of one facing along the direction of travel while positioned at the intersection point on the segment nearest the bias point (a segment may produce more than one intersection with the ray), and following the segment to the first junction of remaining segments, where a left-most turn is performed. The traversal along and turning onto remaining segments is continued until the loop closes. If a dead-end is encountered, the portions of the segments forming the dead-end are eliminated from further consideration in loop-chasing and the procedure continues from the point at which it encountered the elements forming the dead-end. If a loop traverses an element twice, that element is also removed from further consideration in loop-chasing, and the loop which encountered this element must be restarted at a point prior to the first traversal of the then-removed element.

When the loop-chasing procedure produces a closed chain of elements, the loop is saved on a list of loops comprising the boundary of the indicated region. The loop is also identified as either the outer loop of the region, characterized by an odd number of intersections with the projected ray, or as an island loop, characterized by an even number of intersections with the ray; this classification is not required, but proves convenient in further processing of the region.

The newly formed loop divides the geometry into two portions: that which contains the bias point, and that which does not. The loop-chasing procedure then utilizes this division of the geometry to quickly identify and eliminate elements from further consideration that cannot be part of loops yet to be located. The rule used to determine whether or not an element should be eliminated from the list of remaining geometry provides that geometry contained in the portion of space which does not contain the bias point, and those elements which have been incorporated into the newly-formed loop, should be eliminated from further consideration in loop-chasing for the current indicated region.

When the list of provided geometry has been depleted by loop-chasing, the resulting set of loops comprise the complete boundary of the indicated region. Optionally, if the loop-chasing procedure produces island loops but no outer boundary loop, it may be preferred that each of the island loops be interpreted as a main boundary, creating as many separate regions as there are islands; this interpretation may be desirable because a region with no outer boundary is infinite in extent, and such regions may not be suitable for further processing.

The step in the geometry preparation procedure which identifies families of coincident endpoints after all segments have been broken into separate nonintersecting segments assists in locating junctions and identifying candidates for the next element of the loop; otherwise the loop formation procedure would be more computation-intensive to produce the correct results.

In addition, the elimination of zero-length segments, coincident elements and "dangling" elements during the geometry preparation procedure improves the performance of the present technique by minimizing the need to eliminate dead-ends by back-tracking during the loop-chasing procedure. Thus, most of the steps of the geometry preparation procedure can be considered optional but preferred.

In practice, the number of rays projected generally equals the total number of loops formed to identify the complete boundary of the indicated region. Accordingly the procedure of the present invention is computationally quite fast and provides the computer aided design system user with a convenient method of selecting out a particular region or regions of the design for further processing.

Preferably, the technique of the present invention also includes a procedure of combining adjacent regions, thereby enabling a user to select a number of discrete regions and have the system determine the boundary of the sum of all the selected regions.

DETAILED DESCRIPTION OF THE INVENTION

Figure 1:
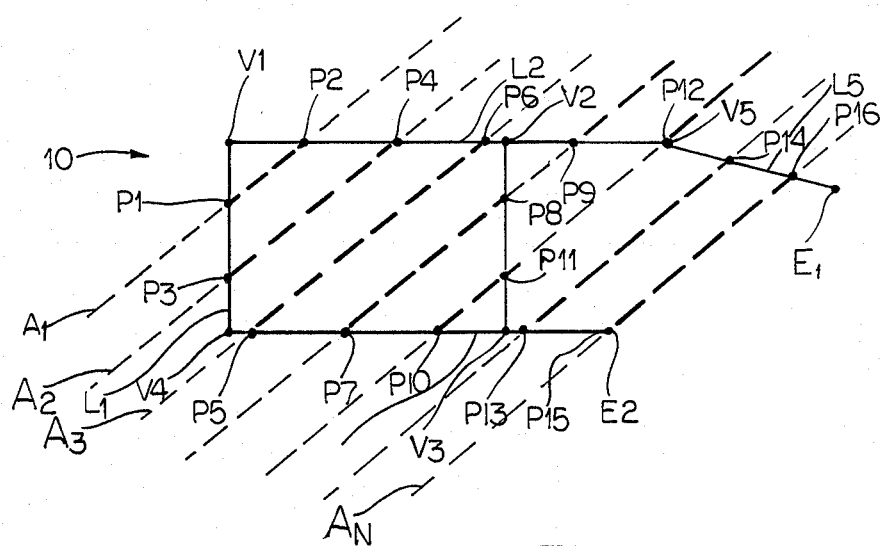
FIG. 1 is a diagram useful in illustrating a prior art method of cross-hatching a selected region of a displayed image in a computer aided design system.

With reference to FIG. 1, there is illustrated a prior art technique which has been used for cross-hatching a selected region of a displayed image generated by a computer aided design system. Although the diagram is quite simple and might represent only a small portion of an overall product design, it will suffice to illustrate the substantial limitations which confronted users prior to the introduction of the present invention. Geometry 10 represents the intersection of lines L1, L2, L3 and L4, to produce vertices V1, V2, V3, and V4 and dangling endpoints E1 and E2. A user desiring to cross-hatch the rectangular area defined by vertices V1, V2, V3 and V4 would initiate a cross-hatch routine by picking the area of interest with a digitizer pen and issue the appropriate cross-hatch command. According to the commonly used cross-hatch routine, the system would internally begin to project diagonal lines A1, A2, A3 ... An across the general area of interest, identifying points of intersection with the lines L1–L4, as points P1 to P16 as shown in FIG. 1. The cross-hatch routine continues by supplying a line segment along each diagonal A1 to An, between each first and second intersection point, between each third and fourth intersection point, etc. along each diagonal; thereby producing the pattern shown in darkened lines in FIG. 1. As can be seen the cross-hatching routine provides the desired cross-hatching within the selected rectangular area; however, it also supplies erroneous lines between and the dangling end segments. Thus, to successfully utilize the routine, the designer was forced to clean up all extraneous lines inside and outside the design prior to initiating the cross-hatching routine.

As an alternative to dealing with the above limitations, at least one commercial system required designers to individually "pick" each element which formed a portion of the boundary of the region of interest, with the further requirement that each such element be separated in the computer's data base from any segment of which it was a part. This approach to the problem was quite unsatisfactory and discouraged the use of functionalities such as area fill, hidden line removal, sectional property evaluation and trimmed surfaces, which required that region boundaries be unambiguously defined prior to further processing.

Figure 2:
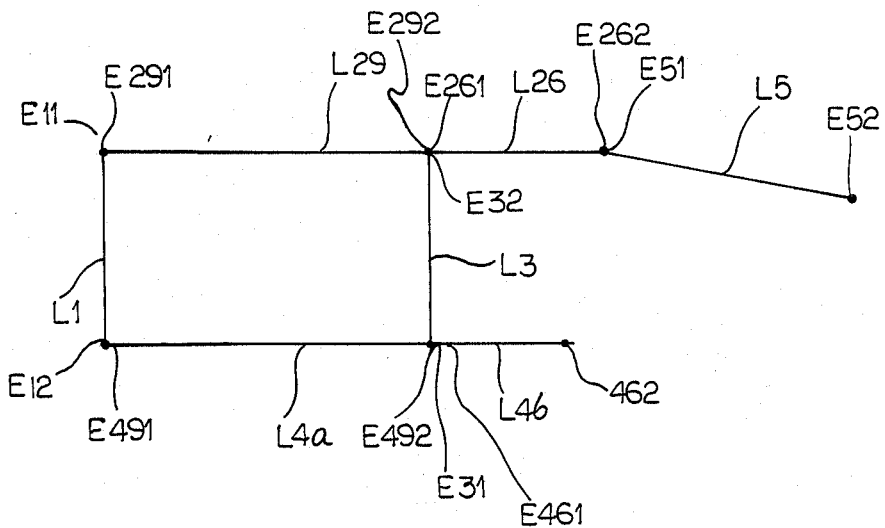
FIGS. 2 and 2A are diagrams similar to FIG. 1 used to illustrate the general technique of the present invention for defining the boundaries of a selected region.

With reference to FIG. 2, a diagram similar to that of FIG. 1 is shown to illustrate the boundary-defining technique of the present invention. The description which follows will relate specifically with an application of the invention to a two-dimensional design problem for clarity of explanation; however, it is to be understood that the invention is not limited to two-dimensional applications and may also prove useful in defining the boundaries of selected regions in three or more dimensions.

The following definitions are provided to clarify the meaning of some of the terms used herein. The term segment means a geometric element of arbitrary dimension, although the discussion of the technique which follows will address mostly the two-dimensional implementation. A segment may be viewed as a set of sub-segements or elements for the purpose of describing which portions of the segment belong to a boundary and which portions do not; this division does not imply actual breaking of the segment into discrete parts.

The term boundary means the set of points which form a set of shells which separate space into two portions: that inside the boundary and that outside. In the two-dimensional implementation, the shells consist of sequences of linked segments which form closed loops which do not cross. In general, the boundary contains both an outer loop which defines the outer limits of the region, and island loops which encircle sets of points which are not part of the desired region. The presence of one type of loop or the other is not required; for example a region boundary which lacks an outer loop is perfectly valid, consisting of the set of all points except those contained by the island loops.

The term region means the set of all points which may be reached from a point known to be in the region by traversing a continuous curve from the given point without crossing any of the boundary elements delimiting the region. All other points are said to be outside the region.

Practice of the technique according to the invention generally can be considered to include three basic procedures: specification of the geometry containing the elements forming the boundary of the region marked for further processing, and including an optional geometry reduction procedure which renders the specified geometric elements into a more convenient state for boundary extraction; a loop-chasing procedure which is applied until the complete boundary of the region is located; and finally and optionally, a region merging procedure for combining and determining the boundary of contiguous regions.

SPECIFICATION OF THE GEOMETRY CONTAINING THE ELEMENTS OF THE BOUNDARY

The technique of the present invention requires that a set of geometry containing the elements of the boundary of the region for further processing be provided. This requirement is shown as step 20 in FIG. 3, and can most generally be satisfied by providing the entire design in which is contained the region of interest. However, by specifying the locality from which the elements of the boundary should be extracted, as shown in the dotted section of FIG. 2, the number of geometric elements considered is reduced, and consequently the efficiency of the boundary identification technique is increased. This can conveniently be accomplished in a variety of ways on commercially available design systems, e.g., by designating with a digitizer pen a diagonal line through the general geometry of interest.

INDICATION OF THE REGION OF INTEREST

In addition to the specification of the general geometry which includes the region of interest, the technique of the present invention requires an identification of the desired region. Generally, the geometry does not unambiguously imply the desired region, and accordingly the region of interest must be indicated explicitly, most simply with a point placed in the region of interest.

Figure 2A:
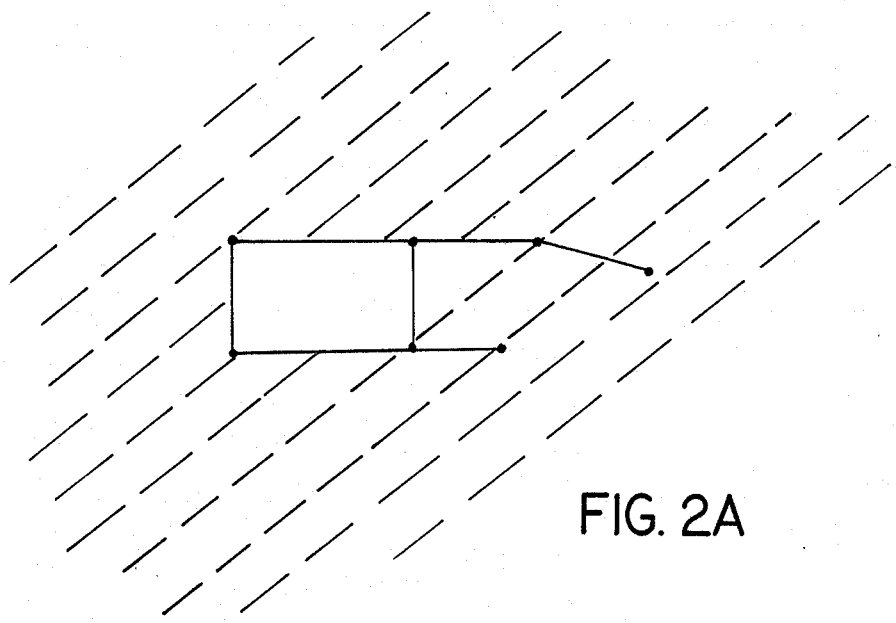

Alternatively, the user may place the bias point outside of the region of interest, which has the effect of locating the boundary of the largest closed region within the geometry. If a bias point is not provided, a point may be generated for the user by system selection of a location sufficiently far from the geometry to assure that the bias point is outside any region which may be enclosed by any boundary contained in the geometry. This bias point serves to identify an infinite region outside the bounded areas within the geometry, an example of which is illustrated in FIG. 2A. If the infinite region is not the region of actual interest to the user, the complement of the infinite region may be readily identified, which complement represents the boundary(ies) of the largest enclosed area within the geometry.

This procedure of identifying the region of interest is termed region biasing, and the point is termed a bias point. If multiple bias points are provided, then the technique of the present invention locates a region corresponding to each bias point, and optionally, determines the boundary of the union of these regions.

REDUCTION OF THE SPECIFIED GEOMETRY

Figure 3:
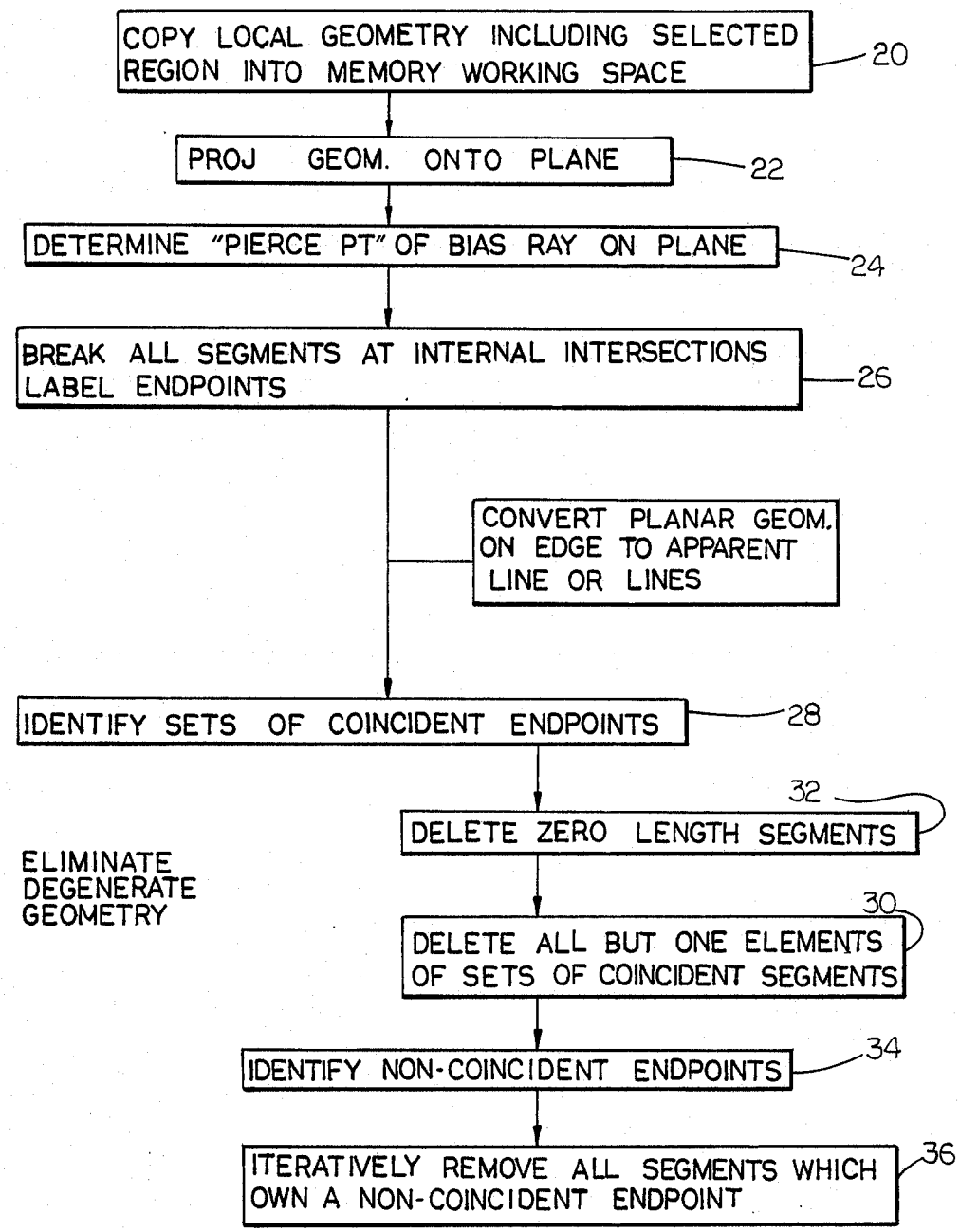
FIG. 3 is a flow chart illustrating in greater detail the initial steps of the boundary-defining technique according to the present invention.

With reference to FIG. 3, a flow chart is provided to illustrate the steps included in a preferred practice of the geometry preparation procedure of the invention. As indicated above, the general area in which the selected region is found is copied from the main data file into separate memory space. A complete copy of the design can be made at the outset of the procedure, although making more local copy improves the performance of the invention by limiting the computation which is necessary in the practice of the invention.

In step 22, the selected geometry is projected into a selected plane, thereby providing a two dimensional data file. The user commonly selects a bias point in step 24 which lies within the selected region, customarily by "picking" the region of interest with the digitizer pen. However, as will be described more fully below, the user might also choose a bias point which is outside a particular region of interest. In step 26, all segments are broken by the system at all intersection points and all endpoints are labeled. With reference to FIG. 2, at this stage in the procedure, lines L2 and L4 have each been broken into two line segments L2a, L2b and L4a, L4b, respectively, with two endpoints En1 and En2 being labeled for each segment Ln.

In a preferred implementation of the invention, a list of all segments resulting from the practice of step 26 is maintained for the remainder of the processing steps, preferably including in such list a pointer to a location in memory where the coordinates of the endpoints of each segment is maintained. In addition, it is desirable that three additional bits of information be associated with each segment in the segment list; a first bit indicating if the segment has been "permanently removed" from consideration, a second bit indicating if the segment has been "temporarily removed" from further consideration, and a third bit indicating if the segment has been used once during a loop-chasing procedure. The significance of each of these pieces of segment status information will become more clear as subsequent steps in the inventive technique are described below.

In step 28, all sets of coincident endpoints are identified, e.g., coincident endpoint sets (E11, E2a1), (E12, E4a1), (E2a2, E32, E2b1), (E4a2, E31, E4b1) and (E2b2, E51) in FIG. 2. This step has the effect of identifying the vertex families in the local geometry, which provides an association between adjoining elements and eliminates the need to search the geometry list to identify adjoining elements during geometry preparation and loop-chasing.

In step 30, all sets of coincident segments are identified, and all but one copy of the coincident segments are permanently removed from further consideration, thereby eliminating all cases of coincident segments. The need for step 30 is not immediately apparent from FIG. 2, because the segments shown therein do not appear to be coincident. However, it can be appreciated that a three dimensional object represented by lines and arcs can readily present coincident segments when projected onto a selected two dimensional plane. To avoid confusion during later steps of the procedure, it is desirable to mark as permanently removed all but one segment from each such set of coincident segments. Use of the vertex family information from step 28 expedites identification of coincident segments.

As an optional step shown in FIG. 3 as step 32, it is preferred that all zero length segments be marked as permanently removed from the segment list, either before or after the practice of step 30. A zero length segment may be formed by the projection onto the selected plane of a line segment which is normal to such plane, or may be formed through prior user error during the creation of the design. Step 32 is optional but to be preferred because computation time is conserved by removing zero length segments at this point in the procedure. Use of the vertex family information from step 28 expedites identification of zero length segments. However, in the absence of the practice of step 32, the technique of the present invention remains effective.

In step 34, all noncoincident endpoints are identified, e.g., noncoincident endpoints E52 and E4b2 of FIG. 2, and in step 36, all segments containing noncoincident endpoints are permanently removed iteratively, it being clear that those segments containing noncoincident endpoints are dangling segments which can not be a part of the closed boundary of the selected region. With reference to FIG. 2, this step has the effect of marking as removed from consideration segments L2b, L4b and L5. Although not always required in such simple geometries, it is a preferred feature of step 36 that the removals occur iteratively; for example, the initial removal of dangling segment L5 results in the formation of another dangling segment L2b which should thereafter be removed before the conclusion of step 36.

Figure 4:
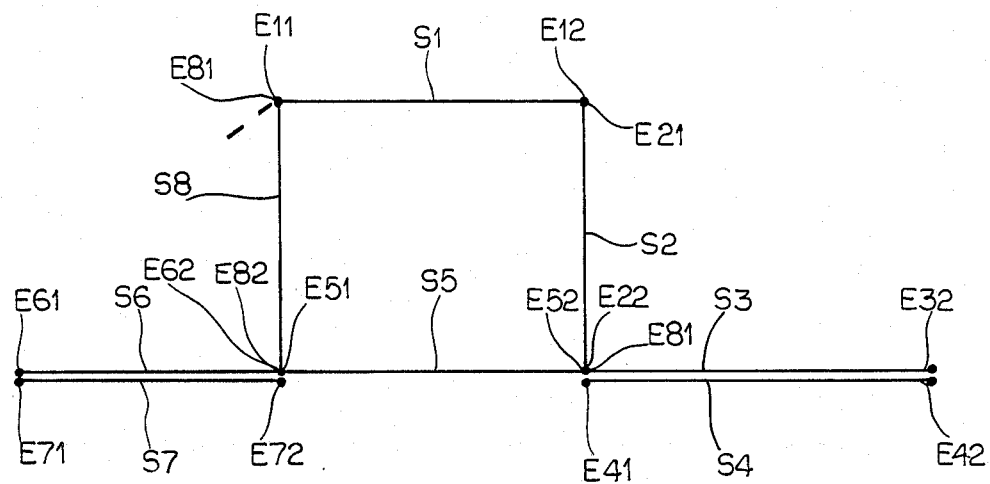
FIG. 4 is a diagram of additional geometry useful in illustrating the desirability of practicing the preferred order of steps in the technique according to the invention.

With reference to FIG. 4, there is shown an example of a design which illustrates the desirability of practicing step 32 prior to practicing step 36. As can be seen from FIG. 4, if the coincident segments S3 and S4 are not first identified and one removed from the geometry list prior to step 36, then at step 36 endpoint sets (E61, E71) and (E32, E42) would not correspond to noncoincident endpoints which are to be removed. However, if step 32 is first practiced, one of each of the coincident segments sets (S3, S4) and (S6, S7) is removed from consideration, leaving the remaining endpoints (E61 or E71) and (E32 or E42) noncoincident and eligible for removal at step 36.

At the conclusion of step 36, there remains from the original geometry a closed-boundary area herein referred to as a "prepared geometry" which includes the selected region but may also contain bounded regions not intended to be a part of the selected region, e.g., regions outside or islands inside the selected region.

LOOP-CHASING PROCEDURE

Figure 5:
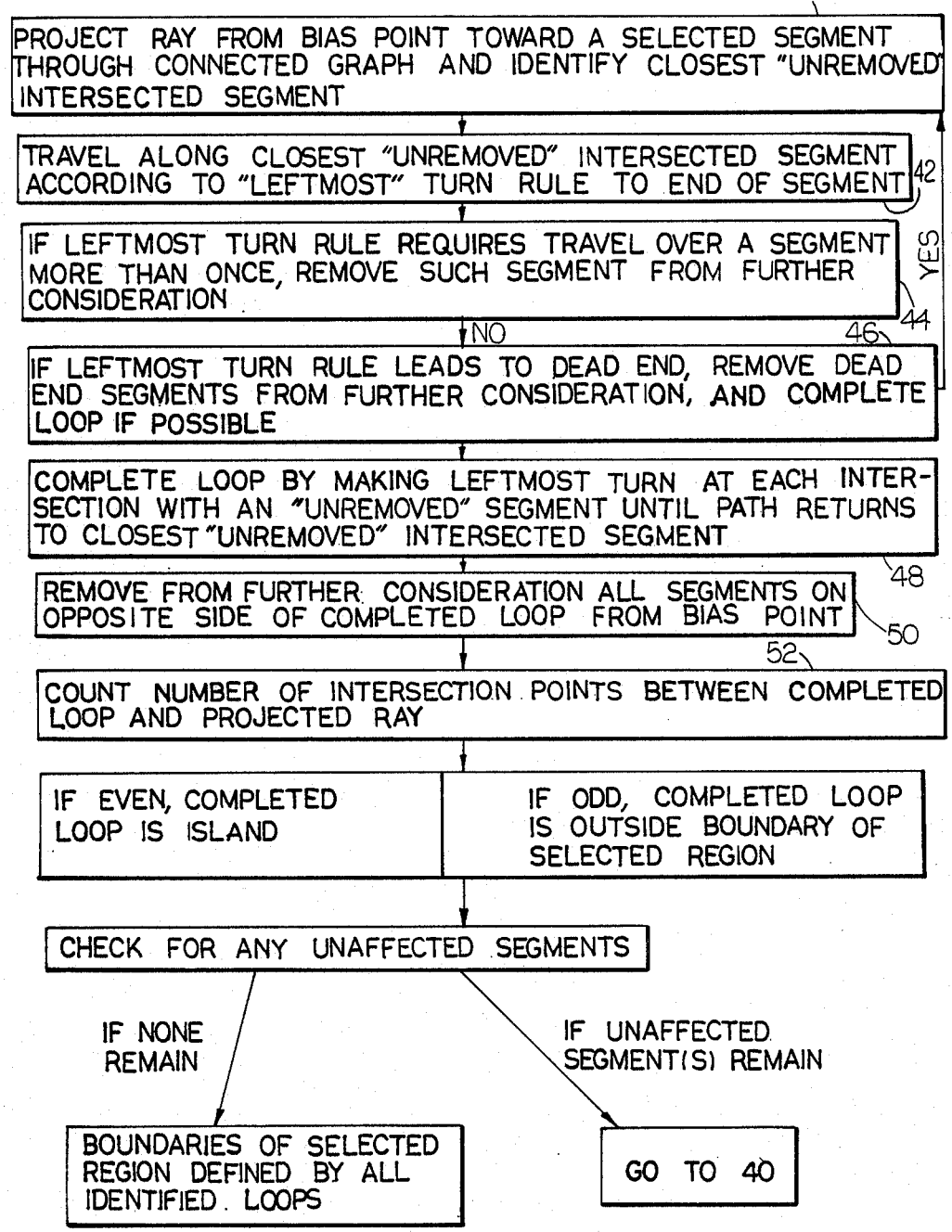
FIG. 5 is a flow chart illustrating the steps of the loop-chasing procedure of the invention.

With reference to FIG. 5, there is shown a flow chart illustrating the intermediate procedure of the present invention, herein referred to as the loop-chasing procedure. In step 40, a ray is extended from the bias point within the selected region in any selected direction, and the closest (i.e. first) segment intersected by such ray is identified. In one simple implementation of this step, the ray is projected in a direction toward the first remaining segment on the list of geometry, although it is common that the closest intersection does not lie on the target segment. In step 42, a direction of travel along the closest intersected segment is determined, by orienting upon the ray intersection point such that the bias point is to the left of the intersection point. Of course it is not limiting to the invention that a left-handed direction is selected as a convention in the preferred practice of the invention, for it will be clear to those skilled in the art that a right-handed convention could have been selected.

After the direction of loop-chasing is established as in step 42, a complete loop is formed by moving along the first segment to its endpoint, and at each endpoint continuing to travel in a left-most direction until the original segment is again reached. The vertex family information from step 28 expedites the identification of the next element to traverse. In this manner, the closest closed loop of which the first-intersected segment is a part will be identified. As loop-chasing progresses, each segment in the loop is preferably marked as having been used once, and upon completion of the loop, also as being temporarily removed from further consideration.

The loop is retained in memory along with the identity of the segments forming the loop.

In step 50, all segments on the opposite side of the first-identified closed loop from the bias point (i.e., residing in the space bounded by the loop which does not contain the bias point) are removed from further consideration in the boundary formation of the currently indicated region, it being clear that such segments can not be a part of the boundary of the desired region. In the event that multiple bias points were selected, requiring the of use of the same geometry set for loop-chasing based on another bias point, these elements are brought back into consideration; hence the above is termed a "temporary" removal from consideration.

Figure 6:
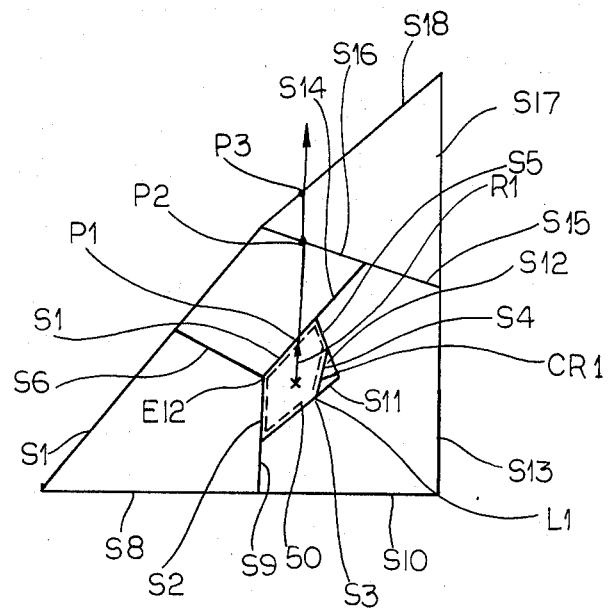
FIG. 6 is a diagram of prepared geometry useful in illustrating the loop-chasing procedure of the invention.

With reference to FIG. 6, the above series of steps is illustrated upon a simple geometry which has been generated using the steps of the geometry preparation procedure described above. In this example, the user has an interest in region CR1 within which bias point 50 is located (shown in bold lines for clarity), but the previous processing has provided a much larger prepared geometry region which includes the selected region CR1. As described in general above, according to step 40 a ray R1 is projected in an arbitrary direction from bias point 50 and produces ray intersection points P1, P2 and P3. P1 is selected as the closest intersection point to bias point 50 and the direction of travel along segment S1 is determined by orienting the bias point 50 to the left of the direction of travel according to step 42. A loop is then "chased" in a generally left-most (i.e., counterclockwise) direction along the length of segment S1 to coincident endpoint E12, where the direction of travel is again determined by the "left-most turn" rule and results in a continuation along segment S2. This process continues along segments S3, S4, and S5 until travel returns to original segment S1. It will be noted that at coincident endpoints such as E12 where more than two segments intersect, the direction of travel is determined to be the left-most direction of travel around the loop. Thus at endpoint E12, segment S2 is followed rather than segment S6.

After closed loop L1 (formed by segments S1–S5) has been identified, all segments on the opposite side of loop L1 from bias point 50 are marked as not being a part of the desired region and accordingly are temporarily removed from consideration. A segment is considered to be on the opposite side of loop L1 if it cannot be reached from bias point 50 without crossing loop L1. Thus in FIG. 6, segments S6 to S18 are removed from further consideration by step 46.

As loop L1 is being chased, a count is preferably maintained of the number of ray intersection points which lie along the loop. If the count results in an odd number of intersections, the loop is known to be a major or outer boundary of the selected region, while an even numbered count permits the conclusion that the loop is an inner (or island) boundary of the selected region. In the example of FIG. 6, only ray intersection point P1 lies along loop L1, and accordingly an outer boundary of region CR1 has been identified.

In the example of FIG. 6, after completion of step 46, all segments in the geometry list have been marked as temporarily removed from further consideration, and accordingly it is clear that loop L1 forms the complete closed boundary of the region sought. Because the system according to the invention preferably keeps a list of each segment in the original geometry and marks each whenever it is used in a loop or is temporarily or permanently removed from further consideration, it is quite simple to conclude that loop L1 must be the boundary of the selected region. However, with geometries more complex than the one of FIG. 6, additional processing steps may be needed to definitively identify the boundary of the selected region.

Figure 7:
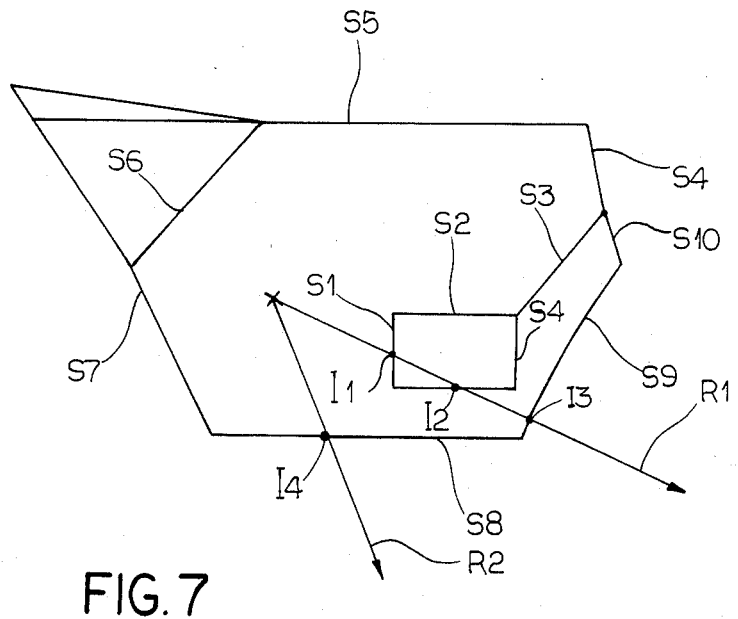
FIG. 7 is a diagram of prepared geometry which includes an island within the selected region to further illustrate the loop-chasing procedure of the invention.

For example, and with reference to FIG. 7, a geometry which includes an island and other unusual line segments within the prepared geometry which includes the selected region will necessitate further processing steps according to the technique of the invention. As shown in FIG. 5 as step 44, if the left-most turn rule requires that the loop-chasing travel over a segment more than one time, that segment must be temporarily removed from further consideration and the loop-chasing procedure must return to a point prior to the first traversal of the removed segment and restart. An example of this type of occurrence can be seen in FIG. 7, where a ray R1 is projected and loop chasing is initiated at ray intersection point I1. Loop chasing proceeds from segment S1 to segments S2, S3, S4, S5, S6, S7 and S8, where application of the left-most turn rule would require that segment S4 be traversed for the second time. According to step 44, segment S4 is temporarily removed from consideration, the "used-once" marks are reset, and loop-chasing is restarted with the projection of ray R1 and proceeds along segments S1, S2, S3 (S4 having been removed from the candidate list), S10, S11 and returning to S1 to complete the loop.

In addition, if the left-most turn rule results in the travel along a "dead-end" path where further travel without backtracking is not possible, step 46 of FIG. 5 provides for the temporary removal of the dead end segments from further consideration and a continuation of the loop-chasing procedure. This particular situation will not generally occur at the initial loop-chasing procedure, because the earlier geometry preparation procedure eliminates all dangling segments from the geometry. However, it is possible that a "dangling" edge will be formed after a first loop has been identified. For example with reference to FIG. 7, if the first loop to be identified is loop L2 defined by segments S4 to S10, then segment S3 will have been left "dangling" by the temporary removal of the segments forming loop L2. If in subsequent loop-chasing the left-most turn rule would lead along S3, step 46 provides for the temporary removal of segments S3 and the return for a continuation of the loop-chasing procedure along segment S11.

If as in the FIG. 6 example, no segments remain in the segment list, then the identified loop(s) forms the complete boundary of the selected region. If additional segments remain that have not been used in the previous steps, it is then necessary to project additional rays from bias point 50 and repeat the left-handed loop-chasing procedure until no segments remain. For example in FIG. 7, after initial ray R1 has been projected from bias point 50 and loop L1 has been traced as described above, a second ray R2 is projected from bias point 50 directed toward one of the remaining segments, e.g., segment S7. Intersection point I4 is marked as closest to bias point 50 and the same left-handed convention is applied to determine direction of travel along segment S7. As the loop is chased, a count is preferably maintained of the number of times the loop intersects projected ray R2, i.e., a count is kept of the number of ray intersection points which fall along the chased loop. After the loop chasing is completed, the final count is reviewed and if even, a determination is made that the chased loop was an island, and accordingly all area within the island is removed from consideration as being a part of the selected region. If the intersection count is an odd number, then a main boundary has been located.

Through this mechanism of counting intersection points between loops and projected rays, the technique of the present invention is able to distinguish between islands and main boundaries and accordingly, functions efficiently without regard to whether the initial projected ray intersects an island or a main boundary, thereby eliminating the need to do more time consuming calculations to assure that the first projected ray intersects a main boundary with its initial intersection point.

The information regarding whether a given loop represents an outer or inner boundary of the selected region is utilized in the region merging procedure of the invention, where the user has selected a number of different closed regions and is interested in the boundary of the overall region. Of course, if the user has selected only a single region of interest, it is not necessary to continue with the region merging procedure which is described hereafter.

REGION MERGING PROCEDURE

Figure 8:
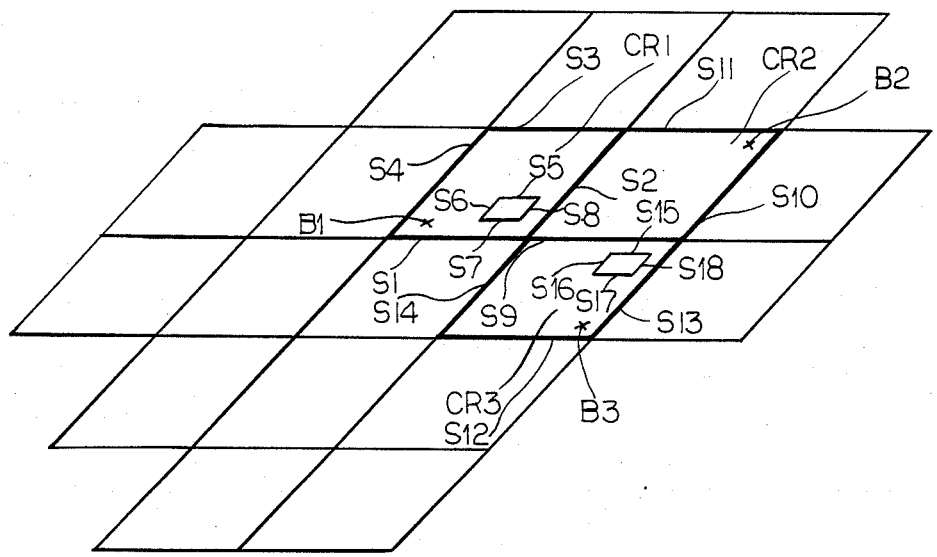
FIG. 8 is a diagram illustrating the region merging procedure of the invention.
Figure 9:
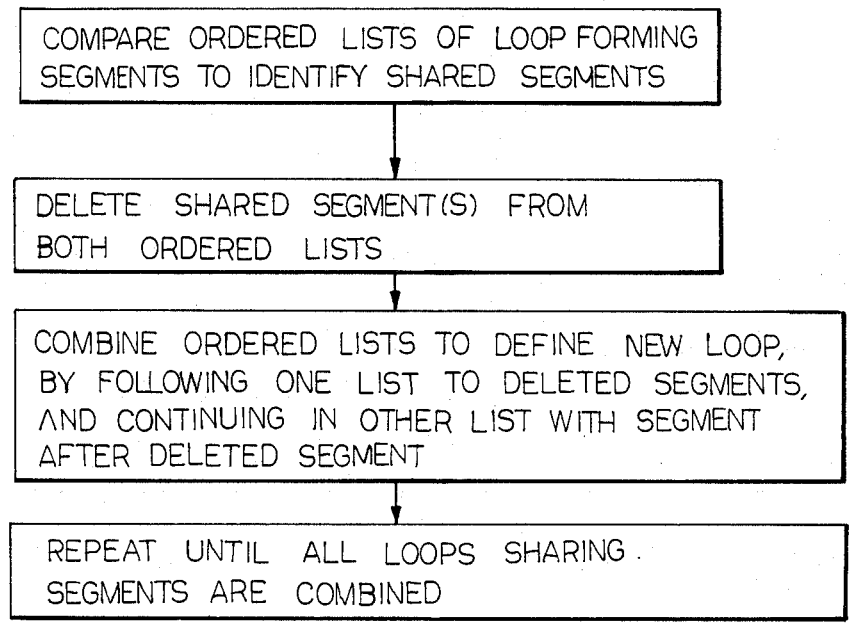
FIG. 9 is a flow chart illustrating the steps of the region merging procedure of the invention.

With reference to FIG. 8, a diagram is shown to illustrate the processing steps of the region merging portion of the present invention, the basic steps of which are provided in flow chart form in FIG. 9. As can be seen in FIG. 9, the user has the ability to select more than a single closed region according to the invention, merely by selecting a number of bias points lying within different closed regions. In a current implementation of the invention, when multiple bias points are selected, the above-described geometry preparation and loop-chasing procedures are performed for each discrete region selected, such that separate closed boundaries for each region will be defined by lists of loops. Then the individual regions are merged into larger regions in the event that they are determined to be contiguous, i.e., at least one segment is shared in the loops which define the boundaries of the selected regions. In a preferred implementation of the region merging procedure of the invention, the combination of adjacent regions can be accomplished very efficiently with only slight computational expense.

As shown in FIG. 9, the ordered list of segments which form the loops defining the boundary of one region of interest are compared with the ordered list of segments of all other boundaries of interest, e.g., the list of segments S1, S2, S3 and S4 defining the outer boundary of region CRI is compared with the list of segments S9, S10, S11, S2 which define the outer boundary of region CR2. The comparison may be conveniently accomplished by performing a simplified version of a loop-chasing procedure; by setting all of the "once-used" flags of a first loop as used, and then by chasing the second loop and setting the flag of each segment to an opposite state as it is used. Through this simple mechanism, it is readily apparent if any of the flags from the segments of the first loop have changed, thereby indicating that those changed segments are shared by the two loops.

Where a shared segment or segments is identified, a combination of the two regions and a determination of the boundary of such combined region is conveniently accomplished by deleting from both ordered lists of segments those segments which are shared, and by sequentially following the new order of the segments, preferably beginning with the first segment after a shared one and continuing in order, and skipping over shared segments to those which follow on the other loop. For example, in FIG. 8, loops L1 and L2 are determined to share segment S2 and the boundary of the combination of loops L1 and L2 is desired for further processing. Ordered segment lists A and B represent the respective boundaries. Segment S2 is removed from both ordered segment lists, and beginning with segment S3 of segment list A, a new ordered segment list is formed by continuing along list A to segment S4 and S1, to the gap left by removed segment S2. At this point in the procedure, the ordered segment list continues onto list B to the segment immediately following the shared segment S2, i.e., segment S9. The new list continues through the undisturbed elements of list B until reaching the removed segment S2, whereupon it continues back to list A and a completed loop. Thus the new oddered segment list representing the boundary of the combined regions CR1 and CR2 is determined to be S3, S4, S1, S9, S10, and S11. The region merging procedure is repeated to combine newly defined region CR12 with region CR3, as shown in FIG. 8.

It is to be noted that the computation required in performing the above procedure is quite simple in that lists of segments are simply being reordered, rather than geometric information about the segments being calculated. Accordingly, the region merging procedure of the present invention is very rapid and does not significantly adversely impact the responsiveness of the system in its ability to determine the closed boundary of substantial numbers of selected regions in a single procedure.

APPLICATIONS OF THE INVENTION

Such a high degree of computational efficiency makes it very beneficial to utilize the procedure of the present invention for purposes not heretofore considered. A number of such applications are described briefly in this section for purposes of illustrating the usefulness of the boundary identification procedure.

One such application is cross-sectional property analysis, which is used by design engineers to extract engineering data such as area, centroid and moments of inertia from a cross-section of a design. This application in general requires that the cross-sectional area be defined by the user as a set of non-intersecting loops; the first loop identifies the outer boundary of the cross-section and is oriented in a counter-clockwise direction, and the remaining loops identify holes in the cross-section and are oriented in a clockwise direction. This format generally burdened the user with a tedious preparation process to define the boundary of the cross-section in the required manner since the prior art systems had no capability to automatically extract and format the boundary of the region to be analyzed from the provided geometry. Improper format of the region boundary inevitably resulted in erroneous values for the properties of the region, resulting in faulty designs when the incorrect analysis went undetected, or repetition of the analysis after correction of the boundary definition when the values produced by the analysis were suspected to be incorrect.

The technique of the present invention produces region boundaries in the exact format expected by such analysis systems; a set of loops are automatically generated, and as a consequence of the left-turn convention, the orientation of the loops is in accordance with the analysis system orientation requirement. Thus the use of the technique of the present invention to prepare the input for an analysis system increases the effectiveness of such an analysis system tremendously while relieving the user of the task of painstakingly preparing the boundary of the region prior to analysis. The use of the technique to prefilter the input to the analysis system constitutes only a relatively minor increase in overall processing time, making the slight increase in computation a worthwhile investment.

Another application which takes advantage of the technique of the present invention is a form of hidden line removal that allows a user to define an opaque region in a display in order to render objects which fall in this region invisible. The user selects a set of geometry which defines the outer and inner boundaries of the opaque region, and then selects geometry which passes through the region; any portions of the selected geometry which fall inside the opaque region are made invisible. This technique is extremely valuable in wireframe geometric models which do not possess enough information to be processed by an automatic hidden line removal procedure (in contrast to surface and solid models).

This hidden line removal technique works only when the opaque region is defined in a manner which consists of a list of loops comprising the boundary of the region. The boundary identification technique is applied to quickly and easily produce the input for this operation which would otherwise generally not be utilized due to the difficulty of providing the boundary of the region with prior art techniques.

A third application in which the technique of the present invention finds considerable value is numerical control toolpath generation. Numerical control toolpath generation techniques generally require that regions indicated for machining be defined precisely by a collection of loops consisting of an outer boundary and islands. Failure to provide the loops in this precise format resulted in invalid toolpath data. Not unlike other applications which require as input a well-defined region, the user of a numerical control toolpath generation system was required to specify the complete set of geometric elements which define the boundary of the region to machine; incomplete or overspecified boundary data would be rejected or lead to improper results. The technique of the present invention, providing input which meets the requirements of the numerical control toolpath generation systems, substantially enhances the efficiency of such data generation.

A final example of an application which is greatly enhanced by the inclusion of the technique of the present invention is the definition of solid bodies formed by the translation of a cross-sectional area along a curve to form shapes termed extrusions, revolutions and sweeps. This type of operation places the same strict conditions on the cross-sectional area as those required by the cross-sectional area analysis systems. The use of the region boundary identification technique greatly simplifies the task of cross-sectional area definition, and assures success in the definition of extruded, revolved or swept solid bodies.

The examples listed above are but a few of the areas in the computer graphics field where preceding an operation with the technique of the present invention adds a marked increase in efficiency and ease of use to the operation. In general, the technique is useful in all areas where a region of interest must be defined in a precise manner, and represented a substantial improvement over methods of the prior art which tended to be error-prone and intensively user-interactive.

An additional benefit provided by the use of the technique of the present invention is the orientation of the loops, which in the cases of the first and fourth application examples is of extreme value. For the successful operation of these applications, the boundary loops must be organized in a manner that the outer loop is oriented in a counterclockwise direction, and the island loops in a clockwise direction. As a consequence of selecting the left-most turn convention for determining the path to follow from a junction of segments, the loops are formed in the convention required by the cross-sectional property analysis and solid modelling applications described above, and hence may be passed to such applications without further processing.

THREE DIMENSIONAL IMPLEMENTATION

The technique of the present invention need not be restricted to geometric elements taking the form of two dimensional curves. The technique applies equally well to boundary elements which are surfaces and to regions which are volumes. Each procedure in the two dimensional implementation of technique has a three dimensional analog.

Figure 10:
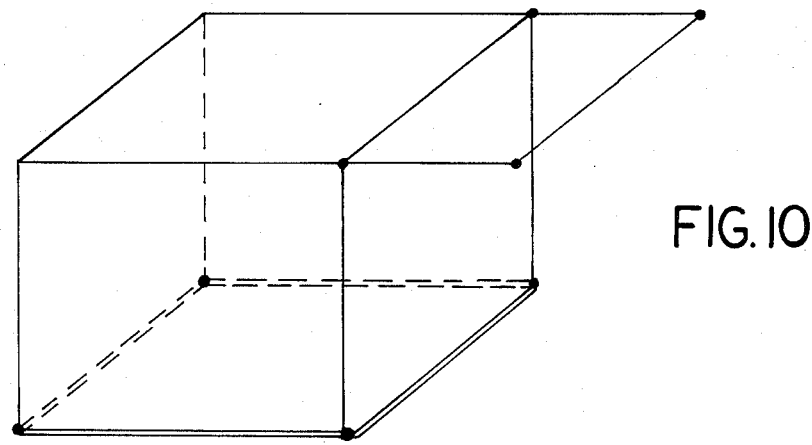
FIG. 10 is a diagram illustrating the applicability of the invention to three-dimensional region boundaries.

An example of a set of three-dimensional geometry which contains the elements of the boundary of a volume is shown in FIG. 10. The volume of interest consists of the enclosed cubical space, and it is desired in certain applications to obtain the only set of surface elements which form the boundary of this volume.

The first procedure, that of identifying the geometric segments which contain the elements of the desired region is identical to the procedure in two dimensions: most generally, the entire design (now described by surfaces) is submitted; a substantial performance increase may be realized by indicating the general locality where the segments containing the boundary elements may be found.

The portion of the first procedure in which the region of interest is identified is also identical to that procedure in two dimensions. Most simply, a point inside the cube is provided. The optional portion of the first procedure, namely that of breaking boundary segments at intersections and eliminating elements which impede the efficiency of loop formation, also applies to the three dimensional implementation. Intersections now occur along curve segments, zero-length segments correspond to zero-area segments, coincident segments correspond to coincident surfaces, and dangling segments correspond to surfaces with free edges. Applying the filtering process yields a set of surfaces from which the boundary of the desired volume region may be expediently extracted. If this optional filtering process is utilized in the above example, the overhang and redundant face shown in FIG. 10 are removed from further consideration.

As in the two dimensional implementation, this process of filtering the surface geometry to eliminate "degenerate" elements is not necessary. This reduction is preferred, however, to optimize the performance of the system in locating the elements forming the boundary of the desired region.

The analogy to loop formation in the three dimensional implementation involves the steps of casting a ray at the geometry remaining in the list to locate the surface which produces an intersection nearest the bias point, identifying the surfaces which bound the first surface and which also contact the indicated region, continuing onto these surfaces to identify their neighbors which also contact the indicated volume (repeating the process until all the neighbors of all the identified surfaces are located to form a closed shell), and eliminating from consideration those surfaces opposite the bias point with respect to the shell as well as those incorporated in the current shell. This procedure is repeated until the list of surface elements is exhausted, yielding the complete boundary of the desired region.

The final and optional procedure of combining adjacent regions also applies to the three-dimensional implementation, where the shared elements correspond to surfaces which have been incorporated into more than one volume region. The technique described for identifying the shared surfaces is identical to that in the two-dimensional application.

The three dimensional implementation of the technique of the present invention has direction application to describing a volume to be used as input to a solid modeller. Volume elements used by solid modellers must meet stringent requirements in order for these elements to be satisfactorily interpreted as solid objects. In general, manual preparation of a set of surface shells to be interpreted as a solid was so error-prone and time-consuming that prior art solid modelling systems did not allow this mode of solid definition. The above-described technique yields volume descriptions in the correct format for input to operations in solid modellers and permits this mode of solid description to be exercised reliably and with ease.

I claim:

1. A technique for operation a computer aided design system for defining the boundaries of a selected region forming a portion of a geometric design defined by geometric elements, comprising the steps of:
   user identification of the region of interest by defining a point within said region;
   projecting a ray from said point through said geometric design;
   identifying intersection points between said ray and said design;
   selecting the geometric element producing a ray intersection closest to said point as a first part of a boundary of said region;
   traversing said selected element to a first junction between said element and another of said geometric elements;
   turning towards the interior of said region;
   traversing elements and turning to the interior of said region until said first part of said boundary is reached.

2. The technique as set forth in claim 1, wherein said identifying step is practiced without regard to the configuration of said geometric design.

3. The technique as set forth in claim 2, wherein said identifying step is practiced without regard to the existence of dangling and redundant elements in said geometric design.

4. A technique for operating a computer aided design system for defining the boundaries of a selected region forming a portion of a geometric design defined by geometric elements, comprising the steps of:
   user identification of the region of interest; identifying a complete set of sequence of linked elements which forms inner and outer boundaries of the region of interest identifying said step including the steps of:
   projecting the selected region onto a plane;
   breaking segments at all intersections;
   identifying all vertex families;
   eliminating all coincident geometry; and eliminating all dangling elements, said dangling elements identified by endpoints which belong to a single member vertex family.

5. The technique as set forth in claim 4, wherein said identifying step comprises the step of eliminating zero length segments from further consideration.

6. The technique as set forth in claim 4, wherein said identifying step includes the step of:
   chasing loops; said loop chasing step including the steps of:
   projecting at least one ray from a bias point through the geometry and identifying ray intersection points between said ray and the elements defining the geometry;
   forming a loop by beginning at the closest ray intersection point, traveling along intersecting elements and performing repeated turnings in a selected direction at intersection points of said elements until travel returns to the original element;
   removing from further consideration elements falling on the opposite side of the loop from said bias point; and
   repeating said loop chasing step until all elements have been removed or identified as being part of a loop.

7. The technique as set forth in claim 6, comprising the step of:
   removing from further consideration any segment over which said loop-chasing procedure would travel more than once in forming any loop; and
   restarting said loop-chasing procedure after said removal.

8. The technique as set forth in claim 6, comprising the step of:
   removing from further consideration any dead-end segments traversed during said loop-chasing procedure.

9. The technique as set forth in claim 6, comprising the step of:
   counting the number of ray intersection points lying along said loop to determine if said loop represents an outer boundary or an island boundary of said selected region.

10. The technique as set forth in claim 6, comprising the step of:
    identifying any unused segments remaining in said geometry after practicing said loop-chasing procedure, and repeating said loop-chasing procedure until all segments have been used in said procedure.

11. The technique as set forth in claim 6, comprising the step of:
    determining the boundary of said selected region to be formed by all loops identified in said loop-chasing procedure.

12. The technique as set forth in claim 4, wherein said identifying step comprises the step of:
    merging selected regions which share elements in boundary-defining loops to determine the boundary of a plurality of adjacent selected regions.

13. The technique as set forth in claim 12, wherein said merging step comprises the steps of:

identifying elements shared in the boundaries of a plurality of selected regions;

deleting shared elements from the loops of each of said plurality of elements; and combining said loops to define a boundary of the combined regions.

14. The technique as set forth in claim 13, wherein said combining step comprises the steps of:

sequentially following an ordered list of loop segments from a first one of said loops until the point where a shared element was deleted; and switching to an ordered list of loop segments for the other of said loops and sequentially following said other ordered list, beginning with the loop segment immediately following where said shared element was deleted.

15. The technique as set forth in claim 4, wherein said user identification step comprises the step of:

placement of a bias point in a position relative to said geometric design to unambiguously define said region of interest.

16. The technique as set forth in claim 15, wherein said bias point is positioned inside said region of interest.

17. The technique as set forth in claim 15, wherein said bias point is positioned outside said region of interest.

18. The technique as set forth in claim 17, wherein said bias point is placed outside said region of interest automatically by said system.

19. The technique as set forth in claim 4, wherein said identifying step is practiced in a two-dimensional domain.

20. The technique as set forth in claim 4, wherein said identifying step is practiced in a three-dimensional domain, wherein the boundary of a volume is defined in terms of surfaces which intersect along line or arc segments.

21. The technique as set forth in claim 4, further comprising the step of:

utilizing the region boundary resulting from said identifying step as input to a cross-hatching, area fill, hidden line removal, sectional property evaluation, trimmed surface treatment or solid modelling routine.

* * * * *